July 24, 1956 — D. HIRST — 2,755,587
CLAY MODELLING DEVICE
Filed Dec. 1, 1954 — 2 Sheets-Sheet 1
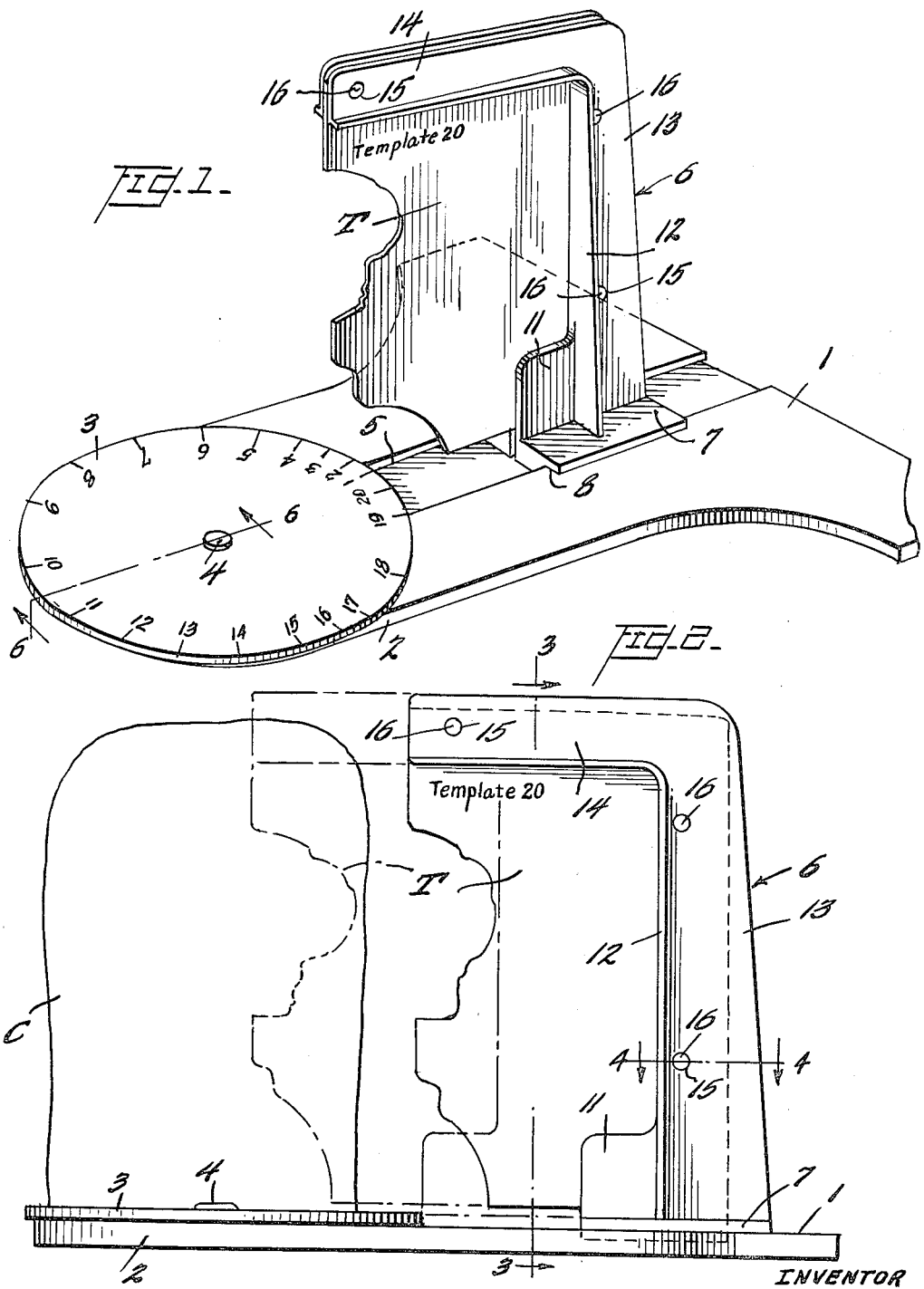
INVENTOR
Donald Hirst
BY Parker Cook
ATTORNEY

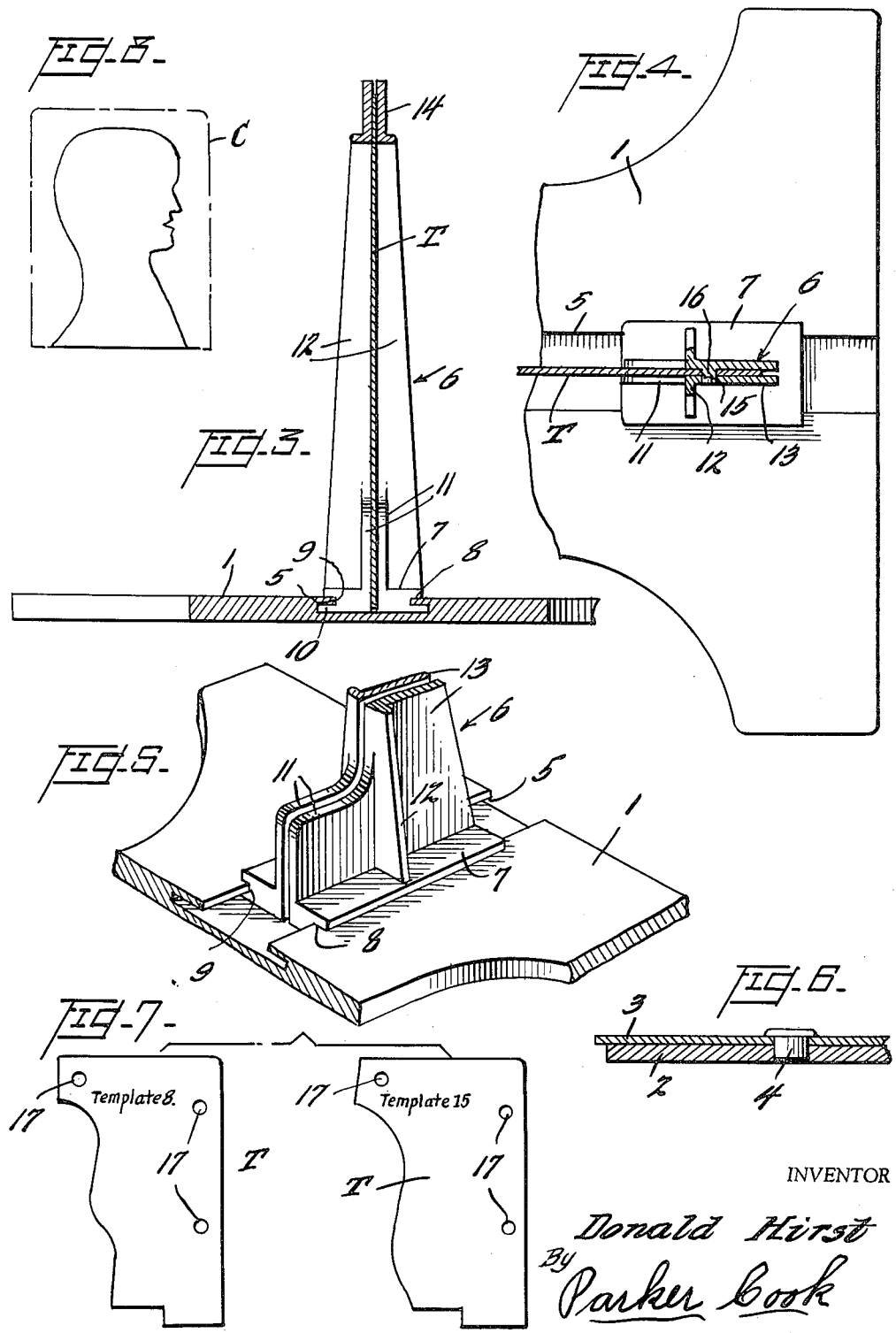

United States Patent Office 2,755,587
Patented July 24, 1956

2,755,587

CLAY MODELLING DEVICE

Donald Hirst, Mays Landing, N. J.

Application December 1, 1954, Serial No. 472,339

1 Claim. (Cl. 41—1)

My invention relates to new and useful improvements in a clay modelling device for sculpturing statuettes, figurines and busts, so that a novice or even a young child may use it by using a plurality of templates as a guide.

With the templates are provided a carriage, a base, and a manually rotatable table divided around its periphery with a number of marked spaces which numbered spaces correspond with numbers on the plurality of templates.

Thus, after the sculptor cuts away a mass of clay so that it follows the curvature of the first template, the table will be turned one notch and a new template fitted in the carriage and the clay again sculptured to fit this template, this process being followed until the table has made one complete revolution.

One of the objects of the invention, therefore, is to provide a base with a removable, rotatable table, which table has spaces respectively marked around its circumference; to provide a carriage manually slideable back and forth on the base, the carriage arranged to hold a series of numbered templates corresponding to the numbers on the table so that the carriage can be advanced to just where the clay is to be cut away; then the carriage moved rearwardly while the sculptor cuts away the clay, and this being repeated until the clay fits within the template when again the carriage will be withdrawn, a new template fitted, and this continuing until the table with its clay has made one revolution and the figurine is completed.

Another object of the invention is to provide a base with a rotatable table, the base having an undercut track therein in which is slideably movable a carriage made of two parts so that it is but a matter of a moment to clamp a new template in the carriage after the figurine has been fitted to the previous template.

It will be understood that for each bust or figurine molded there will be a separate set of templates, consecutively numbered, and a new rotatable table, because some figurines, for instance, might need twenty templates to give twenty vertical sections, while another figurine might call for twenty-five templates.

Still another object of the invention is to provide a small sculpturing set wherein all the parts may be molded from plastic and the templates cut from a fiber board, or even a plastic, so that the set is relatively cheap to manufacture.

Another object of the invention is to provide the base with an undercut groove or track and a carriage formed in two parts, one part having slightly protruding dowel pins on the inner surface, and the other with receptive holes; and the templates in turn having apertures in their upper and lower ends, or at their rear, so that a template may quickly be clamped within the carriage when the carriage is not within its track. Then when the carriage is placed within its track, the two parts of the carriage will be held tightly together; and likewise the templates will be held within the carriage and will be held from movement or deflection, due to the dowel pins passing through the receptive holes in the templates.

With these and other objects in view, the invention consists in certain new and novel arrangements and combinations of parts as will hereinafter be more fully described and pointed out in the claim.

Referring now to the drawings, showing a preferred embodiment,

Fig. 1 is a perspective of my clay modelling set and showing a template in position, Fig. 2 is a side elevation, showing a template within the carriage, a cylinder of clay on the table, and the clay having been cut away to follow the outline of the template, Fig. 3 is a sectional view taken on line 3—3 of Fig. 2, looking in the direction of the arrows and showing a template clamped in position, Fig. 4 is a detailed sectional view, taken on line 4—4 of Fig. 2, Fig. 5 is a fragmentary perspective, showing a portion of the base and the lower end of the carriage, Fig. 6 is a fragmentary, sectional view, taken on line 6—6 of Fig. 1, showing how the table is pivotally mounted, Fig. 7 is a side elevational view of two of the templates, and Fig. 8 is a view, showing how a completed sculptured head would look.

Referring now for the moment to Figs. 1 and 2, there is shown a base 1, which is large enough and wide enough to support a carriage. At the forward end 2 of the base 1 there is removably mounted a table 3, the table 3 being temporarily held by the pivot 4, which may also be seen in Fig. 6.

Now, this table 3 is marked off around its circumference, starting with the number "1," as may be seen in Fig. 1; and in the present instance the table 3 is shown with twenty markings or twenty divisions, which means, as will later be explained, that to form the figurine, it will be necessary to sculpture the figurine to fit twenty different templates.

As heretofore mentioned, some busts or figurines might need only fifteen templates, but with each set of templates there will be furnished a table 3, whose circumference is marked off into the number of spaces to correspond with the number of templates to be used.

The base 1 is also provided with the under-cut groove 5 that extends from the rear or distal end up to the periphery of the heretofore mentioned table 3; and it is in this track 5 that a carriage 6 is to be moved, that is, forwardly and rearwardly as the clay is cut away until the clay follows the outline of the template.

Referring now to the carriage 6, it will be noticed that it comprises two like parts, so a description of one part is a description of the other with the exception that one part has dowel pins on its inner surface while the other has receptive holes.

Referring now to Figs. 1, 2 and 5, especially, it will be seen that the carriage 6 has a base plate 7, which is slightly undercut as at 8 and then provided with the groove 9 and the projecting flange 10 to fit within the groove 9.

Extending from the base plate 7 is the clamping plate 11 which merges with the outwardly extending rib 12, forming a part of the upright 13, from the top of which there extends at right angles the arm 14. There are holes 15 formed in the arm 14 and the upper upright 13 in which dowel pins 16 will fit.

Now, the width of the track 5 and the width of the two parts of the carriage 6 when fitted together with a template therein, as will be mentioned shortly, is such that the two parts of the carriage 6 will be tightly held in position, and that in turn will clamp a template between them.

This carriage 6 may also be formed of molded plastic, and, as there is never any real strain on it, it will last indefinitely.

Referring now to Figs. 1, 2 and 7, I have shown a template T; and these templates T are precut by the manufacturer, so that after the figurine has made one revolution on the table and each of the templates has been used, the figurine will be complete, and sculptured, of course, in accordance with the series of templates T.

Looking at Fig. 7, for the moment, it will be seen that the template T is provided with holes or apertures 17 that correspond in position with the holes 15 and the dowel pins 16 in the two parts of the aforementioned carriage 6. To place a template T in position, the carriage 6 is removed from its track 5, the template T fitted between the two parts of the carriage 6 so that the dowel pins 16 will pass through the openings 17 in the template T, and then the carriage 6 placed back in its track 5 so that the template T will be held firmly in position.

It is also to be noticed that the base 7 of the carriage 6 will impinge against the circular plate 3 when the carriage 6 is in its foremost position, so that there is no danger of the template T going past a vertical line drawn through the pivotal point of the rotatable plate or table 3.

It will also be understood that it is not absolutely necessary that the sculptor start with template number 1, but, after he once starts he must use consecutively numbered templates, so that on a complete rotation of 360°, the figurine will have followed the outline of the various templates, thus getting each section, such as a center face, a full quarter-side, rear, etc.

To briefly repeat the operation, the sculptor will place a cylinder of clay C on the table 3 and will remove the carriage 6 from the track 5 and, we will say, put in template number 1. He will then advance the carriage 6 until it touches the cylinder of clay C, where he should start chipping off the clay. He will then move the carriage 6 rearwardly and start cutting away the clay C and then push the carriage 6 again forwardly to see where he wants to cut away more clay, and continue doing this until the base 7 of the carriage 6 contacts with the periphery of the table 3. The outline then of the cylinder of clay C will appear as in Fig. 2.

The table 3 is then turned one notch and the carriage 6 again removed from its track 5 and template number 2 placed in the carriage 6; and, here again, the same method is continued until the base 7 of the carriage 6 again strikes the table 3. This is repeated until the table 3 has turned 360° at which time the figurine or bust will have been completed.

It will be understood that the clay used is the one that hardens when it comes in contact with the air and not the malleable kind, and the clay should be kept damp by covering with a damp cloth until ready to be used.

Of course, for each new figurine to be sculptured, it will be necessary to remove the table and insert a new table and consecutively insert the new templates that are provided with that table.

From the foregoing it will be seen that I have provided a clay modelling device for sculpturing statuettes, figurines and busts that will be instructive as well as affording amusement; and anyone, especially one showing aptitude, should turn out perfect little figures or figurines.

Having thus described my invention, what I claim is new and desire to secure by Letters Patent is:

In a clay modelling device for modelling and sculpturing statuettes, comprising a base; a removable, rotatable, circular table mounted on said base, the table having its circumference divided into numbered spaces and adapted to hold a mass of clay; a carriage having a tongue and groove bottom for holding the same within the base; a plurality of numbered templates, corresponding to the numbers on the table, said templates to be clamped within said carriage; the carriage movable forwardly and rearwardly on said base to consecutively present the desired numbered templates after the table has been rotated through one of its numbered spaces, the forward edge of the carriage adapted to impinge against the circumference of the table, and the table acting as a stop so that the templates can not be forced past a vertical line drawn through the center of the table.

References Cited in the file of this patent

UNITED STATES PATENTS

| | | |
|---|---|---|
| 43,822 | Willeme | Aug. 9, 1864 |
| 2,213,784 | Landow | Sept. 3, 1940 |
| 2,564,789 | Moss | Aug. 21, 1951 |